United States Patent Office 3,773,939
Patented Nov. 20, 1973

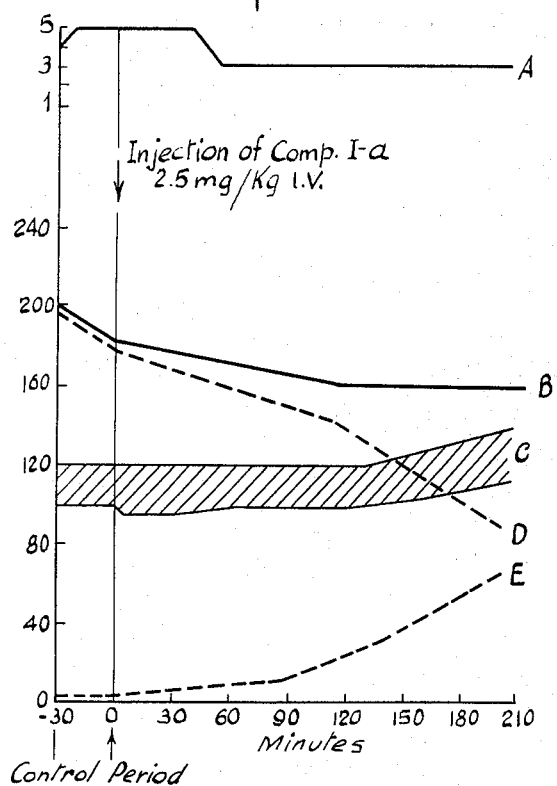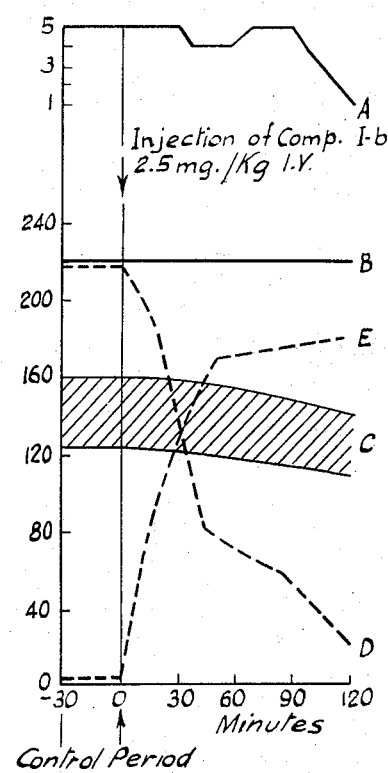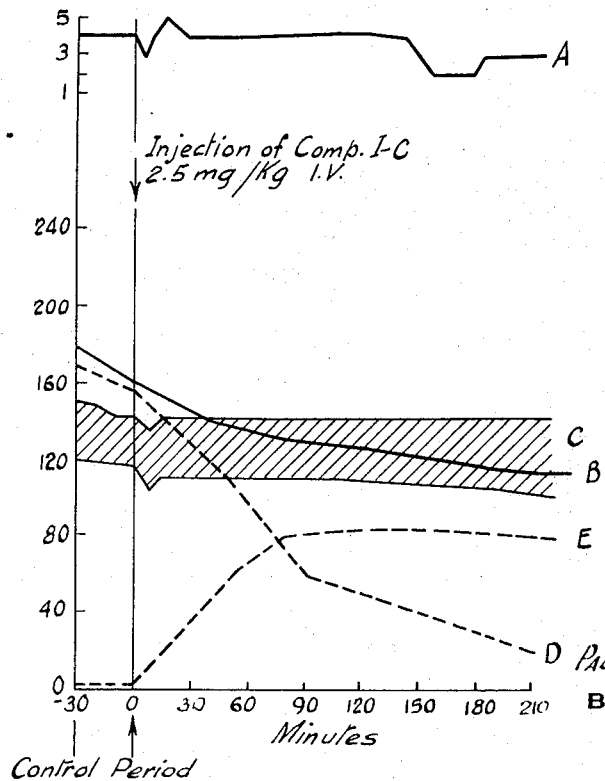

3,773,939
N-ARALLYL-N'-ARALKYL PIPERAZINE
PHARMACEUTICAL COMPOSITIONS
Paul Adriaan Jan Janssen, Vosselaar, Belgium, assignor to Janssen Pharmaceutica, N.V., Beerse, Belgium
Continuation-in-part of abandoned application Ser. No. 741,999, July 2, 1968. This application Nov. 24, 1971, Ser. No. 201,893
Int. Cl. A61k 27/00
U.S. Cl. 424—250
11 Claims

ABSTRACT OF THE DISCLOSURE

Pharmaceutical compositions of N-arallyl-N'-aralkyl-piperazines having anti-arrhythmic and vasoconstriction inhibiting activities.

CROSS-REFERENCE TO RELATED APPLICATION

Figure 4:
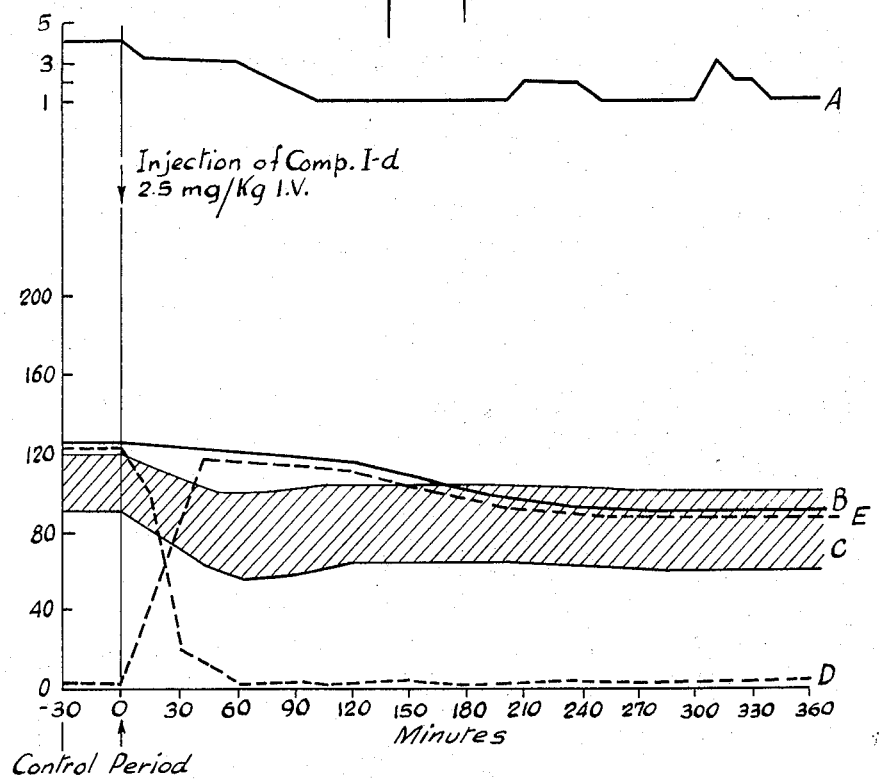

This application is a continuation-in-part of my copending application Ser. No. 741,999, filed July 2, 1968, now abandoned.

This invention relates to pharmaceutical compositions, preferably in dosage unit form, comprising an N-arallyl-N'-aralkyl piperazine or a therapeutically active acid addition salt thereof as the active ingredient. More specifically, such disubstituted piperazines are N-cinnamyl-N'-benzhydryl piperazines having the formula:

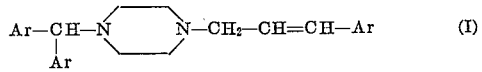

wherein Ar is a member selected from the group consisting of phenyl and fluorophenyl, preferably para-fluorophenyl; provided that at least one of said Ar groups is fluorophenyl. It has been found that such disubstituted piperazines and the therapeutically active acid addition salts thereof possess marked anti-arrhythmic activity and, in addition, are potent inhibitors of vascoconstriction.

The disubstituted piperazines of Formula I are readily prepared by the condensation of an appropriate N-benzhydryl-piperazine of Formula II with an appropriate cinnamyl halide of Formula III. Alternatively, the subject piperazines may be obtained by the condensation of an appropriate benzhydryl halide of Formula IV with an appropriate N-cinnamylpiperazine of Formula V. The condensations can be carried out in suitable organic solvents such as, for example, aromatic hydrocarbons, e.g., benzene, toluene, xylene and the like, lower alkanols and lower alkanones. Since during the condensation an equivalent of acid (HX) is liberated, it is desirable to use an appropriate amount of a suitable base, e.g., an alkali metal carbonate, a trialkylamine, pyridine and the like, to combine with the acid released. The presence of a catalytic amount of potassium iodide is also desirable. The foregoing condensations may be illustrated by the following reaction scheme:

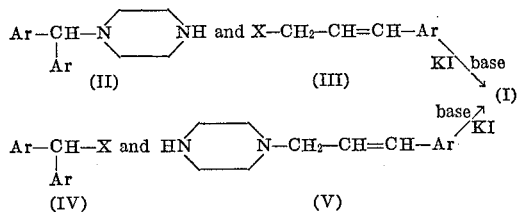

wherein Ar is as previously defined and X is halo, preferably chloro.

The organic bases of Formula I may be converted to the corresponding pharmaceutically acceptable acid addition salts by reaction with an appropriate inorganic acid, such as, for example, hydrochloric, hydrobromic, hydriodic, sulfuric, phosphoric and the like acids, or with an appropriate organic acid, such as, for example, acetic, propionic, glucolic, lactic, oxalic, malonic, tartaric, citric, sulfamic, ascorbic and the like acids. In turn, the salts of Formula I may be converted to the corresponding base form by conventional treatment with suitable alkali.

The subject Compounds I, in base or salt form, have been found to possess valuable pharmacological properties. Such compounds are useful as anti-arrhythmic agents as demonstrated by their ability to markedly decrease fibrillation in laboratory animals, for example, anesthetized dogs. The anesthesia consists of morphine sulfate (2.5 mg./kg.) s.c., dialbarbital sodium (25 mg./kg.) and urethane (200 mg./kg.) i.v. The dog's chest is opened under artificial respiration and one or two drops of a 10% acetylcholine solution is applied on the exposed left atrium followed by stroking of the atrium with a blunt spatula. The resulting atrial fibrillation is recorded by an unipolar auricular ECG lead. Atrial fibrillation is produced at least twice during the control period of 30 minutes. Thereafter, the compound to be tested is administered i.v. It has been found that about 5 mg./kg. i.v. of the subject compounds restores atrial fibrillation to normal sinus rhythm.

The following is another method for determining the anti-arrhythmic activity of the subject piperazines. The test is carried out under neuroleptanalgesia [1 cc. per 20 lbs. body weight of fentanyl (0.4 mg./cc.) and droperidol (20 mg./cc.)]. About 16 hours after ligation of the anterior descendens branch of the left coronary artery, dogs exhibit a multifocal ventricular arrhythmia which is recorded. After a control period of 30 minutes, the compound to be tested is administered i.v. The anti-arrhythmic activity of the subject piperazines is graphically exemplified in FIGS. 1–4. The injection of 2.5 mg./kg. rapidly decreases the number of premature beats (curve D) and at the same time markedly increases the number of normal beats (curve E).

In FIG. 1, the compound tested is 1-(p-fluorocinnamyl)-4-(p-fluoro-α-phenylbenzyl)piperazine dihydrochloride (Comp. I–a).

In FIG. 2, the compound tested is 1-benzhydryl-4-(p-fluorocinnamyl)piperazine (Comp. I–b).

In FIG. 3, the compound tested is 1-cinnamyl-4-(di-p-fluorobenzhydryl)piperazine dihydrochloride (Comp. I–c).

In FIG. 4, the compound tested is 1-cinnamyl-4-(p-fluoro-α-phenylbenzyl)piperazine dihydrochloride (Comp. I–d).

From these figures, it is evident that the compounds of Formula I, in base or salt form, are potent blockers of ventricular arrythmia. It is understood that the compounds tested therein are not stated for purposes of limiting the invention thereto, but only to show the useful properties of compounds within the scope of Formula I. In the figures, the different parameters identified by alphabetical symbols are defined as follows:

Curve A=number of repeatedly firing pace-makers;
Curve B=total heart rate (beats) per minute;
Curve C=blood pressure in mm. Hg (arterial pressure recorded by catheter inserted in femoral artery), upper curve=systolic, lower curve=diastolic;
Curve D=number of pathological beats per minute; and
Curve E=number of normal beats per minute.

Figure 5:
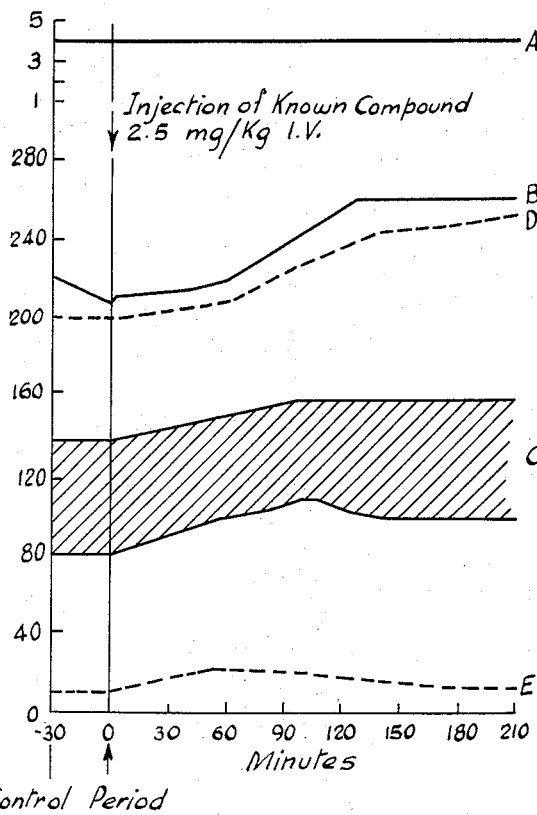

The anti-arrythmic activity observed with the subject piperazines is an unexpected and surprising effect in view of the fact that the corresponding disubstituted piperazines wherein chlorophenyl is substituted for fluorophenyl are devoid of this activity. This is exemplified in FIG. 5, which graphically illustrates the influence of the known compound, 1-cinnamyl-4-(p-chloro-α-phenylbenzyl)piperazine dihydrochloride (described in U.S. Pat. No. 2,882,-

271), on the ventricular arrythmia induced after ligation of the anterior descendens branch of the left coronary artery in dogs. As shown therein, 2.5 mg./kg. i.v. of this compound results in an increase rather than a decrease of pathological heart beats (curve D) with a simultaneous negligible increase in the number of normal beats (curve E).

In addition to the aforementioned anti-arrythmic activity, the subject piperazines are potent inhibitors of vasoconstriction, as demonstrated by their ability to inhibit induced vasoconstriction in laboratory animals, for example, in tests on the peripheral vascular system and coronary system of anesthetized dogs.

These tests on the peripheral vascular system are carried out in anesthetized mongrel dogs of both sexes weighing from 7 to 11 kg. ($\overline{m}$: 9 kg.). The dogs are premedicated with 2.5 mg. per kg. of morphine hydrochloride s.c. followed, one hour later, by 0.25 ml. per kg. of an i.v. injection of "dial-urethane," a mixture of 0.4 g. urethane, 0.4 g. ethylurea and 0.1 g. sodium diallylbarbituric acid per ml. The left brachial artery and vein and the femoral arteries on both sides are cannulated. Heparin (1000 units per kg.) is injected into the brachial vein; the trachea is intubated. Arterial blood is then derived from the left femoral artery and reinfused at a constant flow rate into the right femoral artery, for example, by means of a Sigmamotor pump. The pump is adjusted before starting the experiment to give a perfusion pressure equal to the mean systemic arterial pressure. Statham pressure transducers are used to measure continuously both the perfsuion pressure (measured between the pump and the right hind leg) and the systemic arterial blood pressure (measured from the brachial artery). These parameters are recorded, for example, on a Watanabe Multirecorder. The heart rate is controlled during the experiment.

Injections of single increasing doses (0.016, 0.063 . . . 16, 63 µg. range) or 1-norepinephrine in 0.1 ml. aqueous solutions are made directly into the perfusion stream at 5-minute-intervals and the dose effect curve is recorded. Following this control period, acidified solutions (pH⩾3.00) of the test compound is infused into the perfusion stream at a constant rate of 0.2 ml. per min. by means of a Braun infusion pump. The doses used are 0 (solvent at pH 3.00), 0.01, 0.04, 0.16 and 0.63 mg. per min. of the test compound. These doses correspond to 0.0011, 0.0044, 0.018 and 0.07 mg./kg. per min. for dogs of 9 kg. Following an infusion period of 1 hour, another dose-effect curve of 1-norepinephrine is produced and recorded. Change in the 1-norepinephrine-induced vasoconstriction is used as an index of the effect on peripheral resistance in the hind leg.

In accordance with such tests, the subject piperazines are found to produce marked inhibition of the vasoconstriction produced by 1-norepinephrine. For example, in a study comparing the most preferred species, 1-cinnamyl-4-(di - p - fluorobenzhydryl) piperazine dihydrochloride, also known generically as "flunarizine," with the prior art compound, 1-cinnamyl-4-(α-phenylbenzyl) piperazine dihydrochloride, also known generically as "cinnarizine," the former is found to be at least 2.6 times more active than the latter in decreasing peripheral resistance in the vascular bed of the dog hind leg; the systemic arterial blood pressure and heart rate remaining unchanged.

Furthermore, flunarizine has been found to have a longer duration of action than cinnarizine, as demonstrated by the bioassay procedure reported by J. M. Van Nueten, Europ. J. Pharmacol., vol. 6, 286–293 (1969) on vasoactive drugs using the isolated perfused central and saphenous arteries of a rabbit. According to this procedure, the peak effect in the resultant time-response curves for flunarizine lasted for the duration of the experiment (>90 min.) at doses of 0.01 to 0.16 mg. on both the perfused central artery of the rabbit ear and the saphenous artery of the rabbit, whereas the response to cinnarizine, added at a dose of 0.01 mg., declined after 30 and 50 minutes for the central and saphenous arteries, respectively.

Considerable higher potency and longer duration of action for flunarizine, as compared to cinnarizine, is also demonstrable in flow measurement tests of the coronary system. These flow increases are completely unexpected in view of the absence of such increases with the corresponding chloro-substituted derivatives.

In addition to studies on laboratory animals, the peripheral vascular effects of flunarizine versus cinnarizine in human patients have also been studied. For example, in a placebo-controlled, double-blind experiment with two cross-overs, a finger plethysmographic assessment of postischemic hyperemia was made. Twelve normal volunteers, six males and six females between 20 and 30 years old, participated in the study. The tests were carried out in an air-conditioned laboratory with a constant temperature of 23° C. Between tests, the subjects remained quietly seated in an adjacent air-conditioned room (23° C.). They were given sandwiches and soft drinks but were not allowed to smoke or drink coffee or alcoholic beverages.

Placebo, cinnarizine (150 mg.) and flunarizine (75 mg.) were supplied in opaque capsules of identical appearance, and individually enclosed in a small envelope bearing the subject's name and date of the trial. One capsule was given to each subject on three different occasions at one-week intervals. Drugs were allocated according to a code table and were equally distributed on the three occasions.

During the tests, the subjects lay supine with their arms and hands at heart level. The resistance of a mercury-filled silastic tubing, applied around the right thumb, was monitored by a resistance bridge and recorded at a speed of 50 mm./min. Thumb pulses and their differential quotient were registered before and after three minutes of ischemia produced by occlusion of the brachial artery with a blood pressure cuff inflated at 180 mm. Hg. The ratio of the differential quotient of the thumb pulse after occlusion over that before occlusion was taken as the parameter of postischemic reactive hyperemia.

The tests were performed before (time 0) and 1.5, 3, 4.5 and 6 hours after drug intake. Blood pressure was determined at the end of each test session.

The results of this study showed that the postischemic hyperemia was comparably enhanced 4.5 and 6 hours after administration of 75 mg. of flunarizine and of 150 mg. of cinnarizine, whereas pulse rate remained unchanged. The results again illustrate the more potent vasodilatory activity of flunarizine as compared to cinnarizine.

To prepare the pharmaceutical compositions of this invention, a N-cinnamyl-N'-benzhydryl piperazine of Formula I or a therapeutically active acid addition salt thereof as the active ingredient is combined in intimate admixture with a pharmaceutically acceptable carrier, which carrier may take a wide variety of forms depending on the form of preparation desired for administration, i.e., oral or parenteral. In preparing the compositions in oral dosage form, any of the usual pharmaceutical media may be employed, such as for example, water, glycols, oils, alcohols and the like in the case of oral liquid preparations such as suspensions, elixirs and solutions; or solid carriers such as starches, sugars, kaolin, lubricants, binders, disintegrating agents and the like in the case of powders, capsules and tablets. Because of their ease in administration, tablets and capsules represent the most advantageous oral dosage form, in which case solid pharmaceutical carriers are obviously employed. For parenteral injection, the carrier will usually comprise sterile water, at least in large part, though other ingredients, for example, to aid solubility, may be included. Injectable solutions, for example, may be prepared in which the carrier comprises saline solution, glucose solution or a mixture of saline and glucose solution. Injectable suspensions may also be prepared in which case appropriate liquid carriers, suspending agents and the like may be employed.

It is especially advantageous to formulate the aforementioned pharmaceutical compositions in dosage unit form for ease of administration and uniformity of dosage. Dosage unit form as used in the specification and claims herein refers to physically discrete units suitable as unitary dosages, each unit containing a predetermined quantity of active ingredient calculated to produce the desired therapeutic effect in association with the required pharmaceutical carrier. Examples of such dosage unit forms are tablets, capsules, pills, powder packets, wafers, teaspoonfuls, tablespoonfuls and the like, and segregated multiples thereof. The amount of active ingredient per dosage unit will be from about 5 mg. to about 500 mg. The preferred dosage is from about 10 mg. to about 100 mg. per dosage unit, particularly for purposes of inhibiting peripheral vasoconstriction.

The process of this invention comprises internally administering to subjects with cardiac arrhythmia or with peripheral vasoconstriction an effective amount of a N-cinnamyl-N'-benzhydryl piperazine of Formula I or a therapeutically active acid addition salt thereof intimately admixed with a pharmaceutically acceptable carrier. Preferably, the dosage per kilo of body weight of the subject treated would vary from about 0.5 mg. to about 10 mg. of the active ingredient. The process also embraces the administration of the hereinabove described dosage unit forms to such subjects for anti-arrhythmic purposes or for the inhibition of peripheral vasoconstriction.

The disubstituted piperazines of Formula I, in base or salt form, are novel compounds and, as such, they constitute an additional feature of this invention. The preferred N-cinnamyl-N'-benzhydryl piperazines herein are those having two of the three Ar groups appearing in Formula I equal to fluorophenyl, and, most preferably, those wherein said two fluorophenyl groups constitute part of the benzhydryl moiety as illustrated by the following formula:

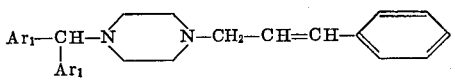

in which $Ar_1$ is fluorophenyl. The most preferred species thereunder is 1-cinnamyl-4-(di-p-fluorobenzhydryl)piperazine.

The following examples are given for purpose of illustration only and are not to be construed as limiting the invention in spirit or in scope. In these examples, quantities unless otherwise stated are given as parts by weight.

EXAMPLE I

A mixture of 66.3 parts of p-fluoro-α-phenylbenzylchloride, 155 parts of piperazine and 800 parts of toluene is stirred first for 2 hours at reflux temperature with water-separator and further for 15 hours at about 95° C. The reaction mixture is cooled to 60° C. and washed four times with 150 parts of water. The toluene phase is separated and extracted twice with 15 parts of glacial acetic acid in 100 parts of water. The water-extract is alkalized with ammonium hydroxide and the product is extracted with toluene. The latter is dried and evaporated. The residue is crystallized from a mixture of ether and petroleumether, to yield 1-(p-fluoro-α-phenylbenzyl)piperazine, M.P. 82° C.

This example demonstrates a method of preparing compounds of Formula II by the condensation of an appropriate benzhydryl halide with an excess of piperazine.

EXAMPLE II

A mixture of 19 parts of 1 - (p-fluoro-α-phenylbenzyl) piperazine, 17 parts of p-fluorocinnamylchloride, 22.3 parts of sodium carbonate, a few crystals of potassium iodide in 480 parts of 4-methyl-2-pentanone is stirred and refluxed for 14 hours with water-separator. The reaction mixture is filtered hot and the filtrate is evaporated. One part of the oily residue solidifies on standing at room temperature. It is filtered off, stirred in petroleumether, filtered off again and dried, yielding the free base, 1-(p-fluorocinnamyl) - 4-(p-fluoro-α-phenylbenzyl)piperazine, M.P. 112–115.4° C. The remaining oily residue is dissolved in 320 parts of acetone and to this solution is added an excess of 2-propanol previously saturated with gaseous hydrogen chloride. The precipitated salt is filtered off, washed with acetone and dried, yielding about 17.5 parts of 1 - (p-fluorocinnamyl) - 4-(p-fluoro-α-phenylbenzyl) piperazine dihydrochloride, M.P. 197.5° C.

EXAMPLE III 50 parts of p-fluoro-α-vinylbenzyl alcohol are dissolved in 160 parts of toluene. This solution is shaken three times with 300 parts of hydrochloric acid. The toluene phase is separated, dried, filtered and evaporated. The oily residue is distilled, yielding p-fluorocinnamylchloride, B.P. 110° C. at 12 mm. pressure.

This example illustrates a method of preparing compounds of Formula III b ycontacting an appropriate benzyl alcohol with HCl. Note: R. C. Lamb et al., J. Org. Chem., 31, 147 (1966).

EXAMPLE IV

A mixture of 25.2 parts of 1-benzhydrylpiperazine, 21.5 parts of p-fluorocinnamylchloride, 42 parts of sodium carbonate, a few crystals of potassium iodide in 520 parts of 4-methyl-2-pentanone is stirred and refluxed for 15 hours with water-separator. The reaction mixture is filtered warm. The filtercake is washed with 4-methyl-2-pentanone and the filtrate is evaporated. The solid residue is recrystallized twice from a mixture of 400 parts of diisopropylether and 80 parts of 2-propanol to yield 1-benzhydryl-4-(p-fluorocinnamyl)piperazine, M.P. 139.5° C.

EXAMPLE V

A mixture of 138 parts α-(4-fluoro-phenyl)-4-fluorobenzyl alcohol and 170 parts concentrated hydrochloric acid is stirred and refluxed for 4 hours. After cooling to about 70° C., a second portion of 100 parts concentrated hydrochloric acid is added and the whole is further stirred and refluxed for an additional 4 hours. After cooling to about 70° C., another portion of 100 parts concentrated hydrochloric acid is added and again the mixture is stirred and refluxed for 6 hours. After cooling, the reaction mixture is kept for 8 hours at room temperature and then extracted with benzene. The organic layer is washed successively twice with water, twice with a solution of sodium hydrogen carbonate and twice with water. After drying over sodium sulfate, the solution is filtered and the filtrate is evaporated. The oily residue is distilled in vacuo, yielding di-(4-fluoro-phenyl)-chloromethane, B.P. 130–133° C. at 1.5 mm. pressure. The undistilled material is treated as described above by respective additions of 100 parts, 40 parts and 30 parts concentrated hydrochloric acid to yield a second fraction of di(4-fluoro-phenyl)-chloromethane, B.P. 129–130° C. at 2 mm. pressure.

EXAMPLE VI

A mixture of 14.3 parts of di-(p-fluorophenyl)-chloromethane, 10.1 parts of 1-cinnamylpiperazine, 12.7 parts of sodium carbonate, a few crystals of potassium iodide in 200 parts of 4-methyl-2-pentanone is stirred and refluxed for 21 hours. The reaction mixture is cooled and 50 parts of water are added. The organic layer is separated, dried, filtered and evaporated. The oily residue is dissolved in 480 parts of anhydrous diisopropylether. This solution is boiled with activated charcoal, filtered and to the clear filtrate is added an excess of 2-propanol, previously saturated with gaseous hydrogen chloride. The precipitated salt is filtered off and recrystallized from a mixture of 2-propanol and ethanol, yielding 1-cinnamyl-4 - (di-p-fluorobenzhydryl)piperazine dihydrochloride, M.P. 251.5° C.

EXAMPLE VII 10,000 hard gelatin capsules, each containing as the active ingredient (A.I.) 25 milligrams of 1-cinnamyl-4-(di-p-fluorobenzhydryl)piperazine dihydrochloride are prepared from the following formulation:

| | Grams |
|---|---|
| A.I. | 250 |
| Lactose | 750 |
| Starch | 250 |
| Talc | 250 |
| Calcium stearate | 10 |

A uniform mixture of the active and supplementary ingredients is prepared and filled into two-piece hard gelatin capsules. The capsules provide satisfactory inhibition of cardiac arrhythmia induced in dogs weighing about 15 kilograms by the oral administration of one capsule three times daily for a few days. The capsules are also suitable for providing satisfactory inhibition of peripheral vasoconstriction upon administration to subjects with peripheral vasoconstriction.

EXAMPLE VIII—TABLETS 5,000 compressed tablets, each containing as the active ingredient 10 milligrams of 1-(p-fluorocinnamyl)-4-(p-fluoro-α-phenylbenzyl)piperazine dihydrochloride are prepared from the following formulation:

| | Grams |
|---|---|
| A.I. | 50 |
| Starch | 75 |
| Dibasic calcium phosphate hydrous | 500 |
| Calcium stearate | 2.5 |

The finely powdered ingredients are mixed well and granulated with 10% starch paste. The granulation is dried and compressed into tablets using starch as a disintegrant and calcium stearate as a lubricant.

EXAMPLE IX—INJECTABLE

The following formulation provides 1 liter of a parenteral suspension comprising 5 mg. of 1-benzhydryl-4-(p-fluorocinnamyl)piperazine as the active ingredient per milliliter:

| | Grams |
|---|---|
| A.I. | 5.0 |
| Polysorbate 80 | 2.0 |
| Sodium chloride | 9.0 |
| Sodium carboxymethyl cellulose | 10.0 |
| Methyl paraben | 1.8 |
| Propyl paraben | 0.2 |
| Water for injection, U.S.P., q.s. add 1 liter. | |

Dissolve the parabens, sodium chloride and carboxymethyl cellulose in ½ the total volume of water by heating to 95° C. to obtain a clear solution. Filter and autoclave. Dissolve the polysorbate in ⅓ the total volume of water. Filter and autoclave this second solution. Add sterile A.I. to the second solution and pass through a sterile colloid mill. To the resulting suspension, add the first solution with uniform stirring. Q.s. with water and stir while filling into sterile vials.

EXAMPLE X—ORAL SUSPENSION

The following formulation provides 5 liters of an oral suspension comprising 25 mg. of 1-cinnamyl-4-(p-fluoro-α-phenylbenzyl)piperazine dihydrochloride as the active ingredient per teaspoonful (5 mls.):

| | Grams |
|---|---|
| A.I. | 25.0 |
| Sucrose | 300.0 |
| Dioctyl sodium sulfosuccinate | 0.5 |
| Bentonite | 22.5 |
| Methyl paraben | 7.5 |
| Propyl paraben | 1.5 |
| Antifoam A.F. Emulsion | 0.15 |
| Propylene glycol | 52.0 |
| FD&C Yellow #5 | 0.1 |
| Sodium cyclamate | 50.0 |
| Sodium saccharin | 5.0 |
| Orange flavor | 7.5 |
| Filtered purified water, q.s., add 5 liters. | |

Dissolve the parabens in the propylene glycol and add this solution to a solution of the sodium cyclamate, sodium saccharin and sucrose in half the water. Suspend the bentonite in hot (about 85° C.) water and stir for 60 minutes. Add the bentonite solution to the former solution.

Dissolve the sulfosuccinate in some water and suspend the A.I. in the resulting solution. Add the Antifoam A.F. Emulsion which has been diluted to a lotion consistency with a minimum amount of water and mix well.

Add the latter suspension of A.I. to the former mixture and mix well. Add the FD&C Yellow #5 dissolved in a small amount of water. Add the orange flavor, q.s. to volume with water, and stir to a homogeneous mixture. Pass the mixture through a colloid mill and fill into suitable containers.

EXAMPLE XI

To a stirred and warm mixture of 20.2 parts of 1-cinnamylpiperazine, 42 parts of sodium carbonate, a few crystals of potassium iodide in 480 parts of 4-methyl-2-pentanone is added dropwise a solution of 26.5 parts of p-fluoro-α-phenylbenzylchloride in 40 parts of 4-methyl-2-pentanone. After the addition is complete, the whole is stirred and refluxed with water-separator for 17 hours. The reaction mixture is filtered warm. The filter-cake is washed with 4-methyl-2-pentanone and the filtrate is evaporated. The oily residue is dissolved in 800 parts of diisopropylether, boiled with activated charcoal and filtered. To the filtrate is added an excess of 2-propanol previously saturated with gaseous hydrogen chloride: an oily salt is precipitated. The solvent is decanted and the residue is crystallized from a mixture of 280 parts of acetone and 280 parts of 2-propanol while cooling. The precipitated product is filtered off, washed with 2-propanol and dried, to yield 1-cinnamyl-4-(p-fluoro-α-phenylbenzyl)piperazine dihydrochloride; M.P. 208–210.6° C.

What is claimed is:

1. A pharmaceutical composition in dosage unit form comprising an effective vasoconstriction inhibiting amount of a member selected from the group consisting of 1-cinnamyl-4-(di-p-fluorobenzhydryl)piperazine and a therapeutically active acid addition salt thereof as an active ingredient in admixture with a pharmaceutically acceptable carrier.

2. A pharmaceutical composition in dosage unit form suitable for inhibiting vasoconstriction comprising per dosage unit from about 5 to about 500 mg. of a member selected from the group consisting of 1-cinnamyl-4-(di-p-fluorobenzhydryl)piperazine and a therapeutically active acid addition salt thereof as an active ingredient in admixture with a pharmaceutically acceptable carrier.

3. The composition of claim 2 wherein said active ingredient is 1 - cinnamyl - 4-(di-p-fluorobenzhydryl)piperazine dihydrochloride.

4. The composition of claim 2 wherein said dosage unit form is a tablet.

5. The compositon of claim 2 wherein said dosage unit form is a capsule.

6. A liquid pharmaceutical composition comprising from about 5 to about 500 mg. per dosage unit of a member selected from the group consisting of 1-cinnamyl-4-(di-p-fluorobenzhydryl)piperazine and a therapeutically active acid addition salt thereof as an active ingredient in a liquid medium suitable for oral administration.

7. The composition of claim 6 wherein said active ingredient is 1 - cinnamyl-4-(di-p-fluorobenzhydryl)piperazine dihydrochloride.

8. An injectable pharmaceutical composition comprising from about 10 to about 100 mg. per dosage unit of a member selected from the group consisting of 1-cinnamyl-4-(di-p-fluorobenzhydryl)piperazine and a therapeutically active acid addition salt thereof as an active ingredient in a liquid medium suitable for parenteral administration.

9. The composition of claim 8 wherein said active ingredient is 1-cinnamyl-4-(di-p-fluorobenzhydryl)piperazine dihydrochloride.

10. A method of inhibiting vasoconstriction which comprises internally administering to a subject a pharmaceutical composition in dosage unit form comprising per dosage unit from about 5 to about 500 mg. of a member selected from the group consisting of 1-cinnamyl-4-(di-p-fluorobenzhydryl)piperazine and a therapeutically active acid addition salt thereof as an active ingredient in admixture with a pharmaceutically acceptable carrier.

11. The method of claim 10 wherein said active ingredient is 1-cinnamyl-4-(di-p-fluorobenzhydryl)piperazine dihydrochloride.

References Cited

UNITED STATES PATENTS 2,882,271    4/1959    Janssen _____ 260—240

OTHER REFERENCES

Physicians' Desk Reference, 1967, pp. 515, 734, 735, 817, 818, 1191, and 1192.

STANLEY J. FRIEDMAN, Primary Examiner

A. J. ROBINSON, Assistant Examiner

U.S. Cl. X.R.

260—240